US011034091B2

(12) United States Patent
Werner et al.

(10) Patent No.: US 11,034,091 B2
(45) Date of Patent: Jun. 15, 2021

(54) APPARATUS FOR ADDITIVELY MANUFACTURING THREE-DIMENSIONAL OBJECTS

(71) Applicant: CONCEPT LASER GMBH, Lichtenfels (DE)

(72) Inventors: Jürgen Werner, Lichtenfels (DE); Benjamin Günther, Lichtenfels (DE)

(73) Assignee: CONCEPT LASER GMBH, Lichtenfels (DE)

( * ) Notice: Subject to any disclaimer, the term of this patent is extended or adjusted under 35 U.S.C. 154(b) by 113 days.

(21) Appl. No.: 16/276,600

(22) Filed: Feb. 14, 2019

(65) Prior Publication Data
US 2019/0358905 A1    Nov. 28, 2019

(30) Foreign Application Priority Data
May 23, 2018 (EP) .................... 18173920

(51) Int. Cl.
*B29C 64/371* (2017.01)
*B29C 64/129* (2017.01)
(Continued)

(52) U.S. Cl.
CPC ........... *B29C 64/371* (2017.08); *B22F 10/20* (2021.01); *B29C 64/129* (2017.08); *B29C 64/165* (2017.08); *G01J 1/4204* (2013.01); *G06T 17/30* (2013.01); *B22F 10/00* (2021.01); *B22F 10/10* (2021.01); *B22F 2201/11* (2013.01); *B22F 2202/11* (2013.01); *B29C 64/153* (2017.08); *B33Y 10/00* (2014.12); *C04B 35/64* (2013.01)

(58) Field of Classification Search
CPC ... B29C 64/371; B29C 64/129; B29C 64/165; B29C 64/141; B29C 64/153; B29C 64/25; B29C 64/35; B29C 64/357; B29C 64/364; B29C 64/386; B29C 64/393; B33Y 10/00; B22F 3/1055; B22F 2201/11; B22F 2202/11; G01J 1/4204; G06T 17/30; C04B 35/64; B22G 10/00; B22G 10/10; B22G 10/20
USPC .......................................... 264/410; 700/117
See application file for complete search history.

(56) References Cited

U.S. PATENT DOCUMENTS 9,005,513 B2    4/2015 Abe et al.
2010/0044547 A1*  2/2010 Higashi .................. B22F 10/00
                                                                                249/79
(Continued)

FOREIGN PATENT DOCUMENTS

CN    101653827 A    2/2010
EP    2431113 A1    3/2012
(Continued)

OTHER PUBLICATIONS

European Search Report Corresponding to Application No. 18173920 dated Nov. 7, 2018.
(Continued)

*Primary Examiner* — Joseph S Del Sole
*Assistant Examiner* — Lawrence D. Hohenbrink, Jr.
(74) *Attorney, Agent, or Firm* — Dority & Manning, P.A.

(57) ABSTRACT

Apparatus (1) for additively manufacturing three-dimensional objects (2) by means of successive layerwise selective irradiation and consolidation of layers of a build material (3) which can be consolidated by means of an energy source (4).

17 Claims, 3 Drawing Sheets

(51) Int. Cl.
| | |
|---|---|
| *B29C 64/165* | (2017.01) |
| *G01J 1/42* | (2006.01) |
| *G06T 17/30* | (2006.01) |
| *B22F 10/20* | (2021.01) |
| *B33Y 10/00* | (2015.01) |
| *B29C 64/153* | (2017.01) |
| *C04B 35/64* | (2006.01) |
| *B22F 10/10* | (2021.01) |
| *B22F 10/00* | (2021.01) |

(56) References Cited

U.S. PATENT DOCUMENTS

| | | | |
|---|---|---|---|
| 2012/0126457 A1* | 5/2012 | Abe | B33Y 50/02 264/460 |
| 2016/0067779 A1* | 3/2016 | Dautova | B23K 15/06 419/7 |
| 2018/0126460 A1* | 5/2018 | Murphree | B29C 64/153 |

FOREIGN PATENT DOCUMENTS

| | | | |
|---|---|---|---|
| JP | 2010/047813 A | 3/2010 |
| JP | 2010/265521 A | 11/2010 |
| JP | 2016/523735 A | 8/2016 |
| WO | 2014176538 A1 | 10/2014 |

OTHER PUBLICATIONS

Machine Translated Japanese Search Report Corresponding to Application No. 2019096931 dated Aug. 21, 2020.

\* cited by examiner

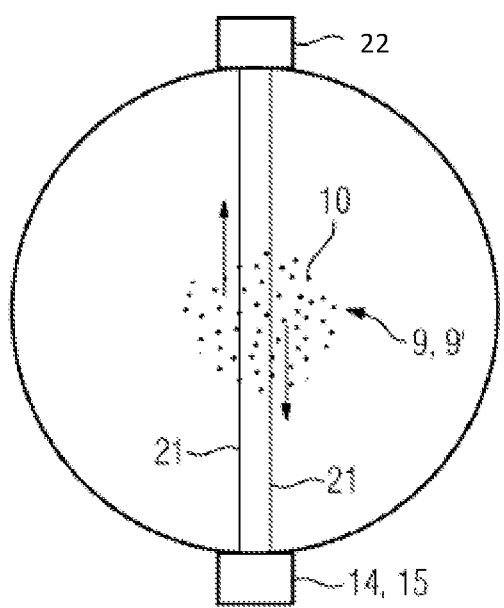
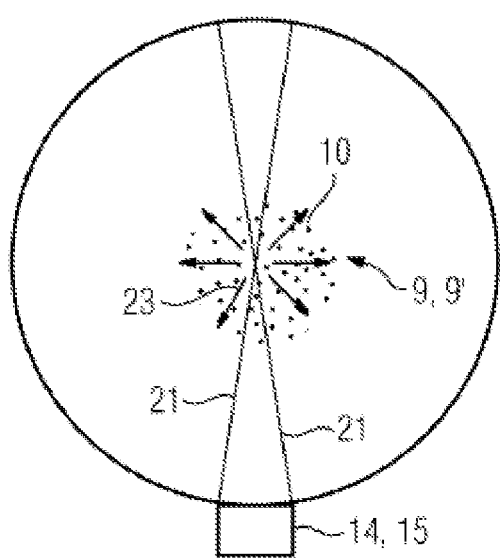

APPARATUS FOR ADDITIVELY MANUFACTURING THREE-DIMENSIONAL OBJECTS

CROSS-REFERENCE TO RELATED APPLICATIONS

This application claims priority to European Patent Application serial no. 18 173 920.2 filed May 23, 2018, the contents of which is incorporated herein by reference in its entirety as if set forth verbatim.

FIELD OF THE INVENTION

The invention relates to an apparatus for additively manufacturing three-dimensional objects by means of successive layerwise selective irradiation and consolidation of layers of a build material which can be consolidated by means of an energy source, which apparatus comprises a stream generating device that is adapted to generate a stream of gas inside a process chamber that is capable of being charged with residues generated in the additive manufacturing process.

BACKGROUND

Apparatuses for additively manufacturing three-dimensional objects are generally known from prior art. Typically, build material is successively and layerwise applied and selectively consolidated, e.g. via irradiation with radiation generated by an energy source. To provide a defined process atmosphere inside a process chamber in which the additive manufacturing process is performed, it is beneficial to have a stream generating device for generating a stream of gas inside the process chamber, wherein the stream of gas can be charged or loaded with residues that are generated in the additive manufacturing process. In particular, swirled up build material particles or smoke particles that are generated in the manufacturing process, particularly during the irradiation of the build material, can be transported outside the process chamber via the stream of gas to avoid the residues influencing the process quality and/or the object quality.

Further, it is known from prior art that residues can negatively influence the additive manufacturing process, although the stream generating device generates the stream of process gas to transport the residues out of the process chamber, since it is possible that more residues are generated than can be transported out of the process chamber via the stream of gas. In such a situation it is not fully assured that residues are properly transported away from a region in which build material is to be irradiated. Remaining residues may influence the additive manufacturing process, e.g. by interacting with radiation emitted by the energy source, such as an energy beam, in particular a laser beam or an electron beam. An interaction of the energy source with residues may lead to absorption or diffraction of the radiation provided via the energy source and therefore, not the proper amount of energy may be depleted in a specific build material volume. In this case, the presence of residues has a negative impact on the consolidation process, as the wrong amount of energy is depleted in the build material, i.e. less energy than required to properly consolidate the build material.

The formulation residues being "generated" in the additive manufacturing process may also relate to residues that are already present in the additive manufacturing process, e.g. present in the process chamber, but not explicitly generated, such as dust particles or raised/swirled up build material, for instance.

It is an object of the present invention to provide an apparatus for additively manufacturing three-dimensional object, wherein the transport of residues out of the process chamber is improved.

The object is inventively achieved by an apparatus according to claim 1. Advantageous embodiments of the invention are subject to the dependent claims.

SUMMARY OF THE INVENTION

The apparatus described herein is an apparatus for additively manufacturing three-dimensional objects, e.g. technical components, by means of successive selective layerwise consolidation of layers of a powdered build material ("build material") which can be consolidated by means of an energy source, e.g. an energy beam, in particular a laser beam or an electron beam. A respective build material can be a metal, ceramic or polymer powder. A respective energy beam can be a laser beam or an electron beam. A respective apparatus can be an apparatus in which an application of build material and a consolidation of build material is performed separately, such as a selective laser sintering apparatus, a selective laser melting apparatus or a selective electron beam melting apparatus, for instance. Alternatively, the successive layerwise selective consolidation of build material may be performed via at least one binding material. The binding material may be applied with a corresponding application unit and, for example, irradiated with a suitable energy source, e.g. a UV light source.

The apparatus may comprise a number of functional units which are used during its operation. Exemplary functional units are a process chamber, an irradiation device which is adapted to selectively irradiate a build material layer disposed in the process chamber with at least one energy beam, and a stream generating device, as described before, which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

The invention is based on the idea that a determination unit is provided that is adapted to determine at least one residue information relating to the residues contained in the stream of gas, in particular an amount of residues and/or a concentration of residues in the stream of gas. Thus, it is inventively achieved that residue information can be determined via the determination unit of the inventive apparatus. The residue information relate to the residues that are generated (or present) in the additive manufacturing process and are contained in the stream of gas, i.e. with which the stream of gas is charged.

The determination of the at least one residue information allows for verifying whether or how many residues are currently generated in the additive manufacturing process or transported via the stream of process gas, respectively. Particularly, it is possible to monitor whether the stream of process gas is capable of being charged with more residues than the residues that are currently generated and transported via the stream of process gas. Thus, if the stream of gas is already saturated, the conclusion can be drawn that not all residues that are generated or present in the additive manufacturing process can be transported and therefore, properly removed from the process chamber via the stream of gas.

Hence, the control of the additive manufacturing process can at least partially be based on the at least one residue information that is determined via the determination unit. For example, the stream generating device may comprise at least one stream of gas that is assigned to at least one part of the build plane in which build material is directly irradiated via an energy beam, such as a laser beam or an electron beam, as described before. Dependent on the residue information it is possible to decide whether the residues that are currently generated in the additive manufacturing process may pose an impact on process quality or object quality or whether the residues can properly be removed from the process chamber via the stream of gas.

Of course, the residue information may comprise multiple (different) pieces of information referring to the residues contained in the stream of gas, e.g. the amount of residues and/or the concentration of residues in the stream of gas and/or a particle size of the residues and the like.

According to a first embodiment of the inventive apparatus, a control unit may be provided that is adapted to control at least one stream parameter, in particular the flow rate of the stream of gas, dependent on the at least one residue information. According to this embodiment, it is possible to control the stream of gas that is generated via the stream generating device, e.g. by controlling a stream parameter that (physically) defines the stream of gas. Hence, the stream of gas may be controlled dependent on the residue information determined via the determination unit. For example, if only a few residues or a comparatively lower amount of residues or a lower concentration of residues in the stream of gas is determined, the control unit may be adapted to set at least one stream parameter correspondingly, for example reduce or lower the flow rate of the stream of gas, whereas if a comparatively high amount of residues or high concentration of residues in the stream of gas is determined, the control unit may be adapted to set at least one stream parameter correspondingly, for example increase the flow rate of the stream of gas, to ensure that the comparatively higher amount of residues or the comparatively higher concentration of residues in the stream of gas can be removed from the process chamber properly.

In other words, it is possible to conclude on the amount of residues that are currently generated in the additive manufacturing process based on the residue information, in particular based on the amount of residues and/or the concentration of residues that are determined as currently being loaded in the stream of gas. Based on this conclusion it is possible to control or vary the stream of gas to properly increase the flow rate, for instance, if more residues are generated in the additive manufacturing process and reduce the flow rate, for instance, if fewer residues are generated. This particularly allows for controlling, i.e. adapting, the stream of gas corresponding to the current need for removal of residues in the additive manufacturing process. Of course, any other arbitrary parameter that is related with the capability of removing/transporting residues out of the process chamber can be controlled via the control unit, such as a streaming velocity of the stream of gas, the temperature of the stream of gas or a specific region in which the stream of gas is generated, for instance.

Further, the control unit or a control unit may be adapted to adjust at least one process parameter, in particular an irradiation parameter, relating to an additive manufacturing process performed on the apparatus dependent on the residue information. Thus, it is possible to have a separate control unit or the same control unit, as described before, being adapted to adjust at least one process parameter. The term "process parameter" may refer to any parameter, in particular of the additive manufacturing apparatus, that influences the additive manufacturing process performed on the apparatus. Exemplary process parameters may be irradiation parameters, such as an intensity and/or a power of the energy source, in particular an energy beam. Therefore, it is possible to adjust the at least one process parameter dependent on the determined residue information. For example, if the residue information that has been determined via the inventive determination unit indicates a comparatively higher amount of residues generated in the current process step of the additive manufacturing process, it is possible to adjust the process parameters accordingly to ensure a proper consolidation of build material, e.g. by adjusting the intensity and/or the power of the energy source to ensure that a proper amount of energy is depleted within the build material.

Hence, it is possible that the control unit may control the additive manufacturing process dependent on the residue information. The control unit may further be adapted to at least temporarily interrupt the manufacturing process, in particular at least one irradiation process, dependent on the residue information. Hence, the additive manufacturing process may temporarily be interrupted or stopped, if the residue information indicates that a proper irradiation of build material is currently not ensured, as the amount of residues that are currently generated in the additive manufacturing process cannot be transported and removed from the process chamber, e.g. since the stream of gas is already saturated. Hence, it is possible that an interaction between the radiation emitted by the energy source, for example an energy beam, and the generated residues occurs that may decrease the process quality or the object quality. In such a situation, in which the residue information indicates a possible impact of the residues on the additive manufacturing process, it is possible that the control unit temporarily interrupts at least one irradiation process, e.g. until a proper removal of residues is ensured or the residue information indicates that the residues present in the process chamber have been reduced.

Thus, the control unit may particularly interrupt the additive manufacturing process, i.e. the at least one irradiation process, until the residue information that is determined via the determination unit, for example continuously or in predefined time periods, indicates that the residues present in the additive manufacturing process allow for a proper irradiation of build material. Of course, the additive manufacturing process, in particular the at least one irradiation process, may be continued after the determination unit determines residue information indicating that the amount of residues or the concentration of residues allows for a proper irradiation process, as the removal of the residues from the additive manufacturing process is ensured.

To improve the control of the additive manufacturing process, the control unit may further be adapted to generate and/or to receive at least one residue threshold, wherein the control unit may be adapted to adjust at least one process parameter, in particular interrupt at least one manufacturing process, with the residue information meeting or exceeding the residue threshold and wherein the control unit is adapted to continue the additive manufacturing process, in particular the irradiation process, with the residue information being below the residue threshold. Of course, the terms "exceeding" and "being below" may vary with the type of residue information that is determined. In particular, it is also possible that the control unit may be adapted to adjust at least one process parameter with the residue information meeting or falling below the residue threshold and the control unit being adapted to continue the additive manufacturing process with the residue information exceeding the residue threshold.

Generally, the residue information may relate to an amount of residues generated in the additive manufacturing process or a concentration of residues in the stream of gas. In those cases it is possible to control the additive manufacturing process, as described before, wherein the control unit may interrupt the at least one manufacturing process, if the residue information meets or exceeds a residue threshold. For instance, if an amount of residues or the concentration of residues exceeds a corresponding threshold value an impact on the additive manufacturing process is possible. Therefore, it is necessary that the control unit is adapted to control the at least one process parameter, in particular to interrupt the at least manufacturing process, until the amount of residues or the concentration of residues has again fallen below the residue threshold. After the concentration of residues on the amount of residues is again below the residue threshold, it is possible that the control unit is adapted to continue the additive manufacturing process, in particular the irradiation process.

Of course, the residue threshold may be a specific value or may be defined as an interval or a range of values. For example, the residue threshold may define a range for the residue information, such as a range of amounts or a range of concentrations of residues that are acceptable for performing the additive manufacturing process. It is also possible that the residue threshold defines a specific value above which (or below which) a proper execution of the additive manufacturing process is not possible.

The inventive apparatus may further be improved in that the control unit may be adapted to interrupt the additive manufacturing process dependent on the residue information, wherein the additive manufacturing process is interrupted after at least one work package is finished, in particular at least one scan vector and/or at least one island and/or at least one stripe and/or at least one layer. Thus, it is possible to finish a work package that is currently being performed, for example that is currently being irradiated before the additive manufacturing process is interrupted via the control unit. This allows for ensuring that a work package is not only irradiated partially, but each work package that has been started will be finished before the manufacturing process is interrupted.

The term "work package" may define a specific task or a specific group of tasks that have to be performed during the additive manufacturing process, in particular the irradiation of build material. Thus, the work package may comprise or may be at least one scan vector along which an energy beam is guided to irradiate the build material. The work package may also comprise or be an island, which is to be understood as a specific region or a part of a layer to be irradiated. The work package may further comprise or be a stripe and/or at least one layer of build material. Hence, the work package that is currently performed on the additive manufacturing apparatus may be finished before the control unit interrupts the additive manufacturing process.

According to another embodiment of the inventive apparatus, the determination unit may comprise at least one sensor that is adapted to measure a transmission of light through a volume of gas, in particular a volume of the stream of gas, to determine the residue information based on transmission and/or the detection of scattered light. Thus, the at least one sensor is used to measure radiation, in particular the transmission of light or the scattering of light and determine the residue information based on the measured values. As the amount of residues or the concentration of residues, respectively, is related with the intensity of light transmitted through the stream of gas or related to the intensity of scattered light, since the light through the stream of gas is absorbed or scattered at particles contained in the residues the stream of gas is charged with, the residue information can be determined based on transmission and/or detection of scattered light. The sensor may therefore, be built as arbitrary optical sensor, such as a CCD sensor or a CMOS sensor that is adapted to generate a signal in relation to an intensity of light being incident on the sensor, for instance.

As described before, the apparatus, in particular the determination unit may comprise at least one sensor. The at least one sensor may be arranged at at least one gas outlet, wherein the stream of gas streams through the gas outlet out of the process chamber of the apparatus and/or at least one sensor may be arranged below a protective glass. The term "protective glass" may refer to any structure through which the energy source is coupled into the process chamber to irradiate the build material. A protective glass in the scope of this application therefore, may refer to any boundary of the process chamber that can be passed by radiation emitted by the energy source, such as an energy beam, in particular a laser beam.

Typically, protective glasses are used to protect the energy source from the atmosphere inside the process chamber, such as residues generated in the additive manufacturing process or thermal influences, such as heat generated by irradiating the build material. The term "glass" does not restrict the protective glass in terms of the material. The protective glass may, for example, be built from or comprising a synthetic material, such as PMMA. The term "below the protective glass" may refer to an arrangement of the sensor next to the protective glass, e.g. next to a scanning unit, preferably arranged directly below the protective glass or arranged a defined distance away from the protective glass. The sensor therefore, may be spaced apart from the gas stream, i.e. in another area of the process chamber than the area through which the stream of gas is streaming. The protective glass may limit the process chamber, for example forming a wall segment or a ceiling segment of the process chamber, wherein the sensor neighbors the protective glass.

The at least one sensor that is arranged at at least one gas outlet may be used to measure the content of residues the stream of process gas streaming through the gas outlet is charged with. Thus, residue information can be generated that can indicate the saturation of the stream of gas in terms of residues, for instance. It is also possible to have at least one sensor or another sensor that is arranged below the protective glass, as described before. As the protective glass is the structure through which the radiation emitted from the energy source is coupled into the process chamber, it is crucial that the area below the protective glass, i.e. between the protective glass and the build plane, is free for the radiation to reach the build plane and properly deplete the energy in the build plane.

For example, residue information generated via the at least one sensor arranged at at least one gas outlet may be used to control the additive manufacturing process, in particular control the at least one process parameter. It is also possible to control the stream generating device, for example by varying or adjusting the at least one stream parameter, e.g. the flow rate of the stream of gas. The at least one sensor arranged below the protective glass may be used to derive information relating to the additive manufacturing process that is currently performed being within a defined window of process requirements. For example, if the sensor that is arranged below the protective glass indicates that an amount or a concentration of residues in the process gas is critical, a negative impact on the process quality and the object quality may occur.

Thus, dependent on the values measured by the sensor that is arranged below the protective glass a direct conclusion on the object quality and/or the process quality can be drawn and an interruption of the additive manufacturing process may be deemed necessary, e.g. if a specific amount or concentration is measured, particularly above the residue threshold. Hence, it is particularly possible that the control unit is adapted to control the additive manufacturing process differently dependent on the values measured via different sensors.

According to another embodiment of the inventive apparatus, at least two determination units may be provided that may be assigned to at least two different outlets, wherein the stream generating device is adapted to guide at least two different streams of gas streaming over different areas of the build plane through the at least two different outlets. Hence, not only one stream of gas may be generated, but it is possible to generate at least two different streams of gas that may stream over different areas of the build plane. The two different streams of gas may stream from different or the same intake to the at least two different outlets, preferably arranged in different positions near the build plane. As two different determination units are assigned to the at least two different outlets, it is possible to determine residue information for each of the at least two different outlets of the apparatus individually. This allows for dividing the build plane in different areas over which a stream of gas can be streamed to remove residues generated in the additive manufacturing process from said areas. Dependent on the residues that are generated in each area, individual residue information can be generated for each area individually.

Preferably, the control unit may be adapted to control the at least one process parameter and/or the at least two different streams dependent on the different residue information determined via the at least two different determination units. Thus, it is possible that the control unit can control the stream parameters of the two different streams that are generated, as described before, streaming over different areas of the build plane dependent on the individual residue information generated via the assigned determination units.

For example, a first determination unit may be assigned to a first area over which a first stream of gas streams from a first intake to a first outlet. Further, a second determination unit is provided and assigned to a second area over which a second stream of gas streams from a second intake to a second outlet. Each determination unit, i.e. the first determination unit and the second determination unit, determine residue information for the first area or the second area, respectively. Of course, each determination unit may comprise at least one sensor that can be arranged at the first outlet or the second outlet, respectively, and/or at least one sensor that may be arranged below the protective glass, as described before. Dependent on the irradiation pattern of the current layer of build material that is to be irradiated during the additive manufacturing process, it is possible that the regions/structures that have to be irradiated are not equally distributed over the first area and the second area. Thus, it may be necessary to control the first stream of gas and the second stream of gas differently to ensure that the residues that are generated over the first area and the second area are properly removed from the process chamber.

For example, if only a minor region (compared to the region to be irradiated in the second area) is to be irradiated in the first area, the first stream of gas may be controlled in that the first stream of gas streams with a comparatively lower flow rate (compared to the second area). Hence, the first determination unit may adjust the first stream parameter accordingly. The second determination unit also determines residue information but for the second stream of gas streaming over the second area. As in this example, the second area comprises more structures to be irradiated than in the first area, more residues are generated in the second area than in the first area. Thus, the second determination unit may control (based on the residue information determined) the second stream parameter in that the second stream of gas may flow with a comparatively higher flow rate (compared to the first area). Hence, it is possible that the control unit may control the flow rate, i.e. the stream parameter, in each area of the build plane individually.

Of course, it is also possible to control the at least one process parameter differently for the at least two areas. Thus, it is possible to interrupt the additive manufacturing process or the irradiation process, respectively in one of the at least two areas, if residues generated in this area meet or exceed the residue threshold, as described before. While the irradiation process is interrupted in the respective area, the irradiation process can be continued in the at least one other area at least as long as the residue information in the other area stays below the residue threshold. The irradiation process can be continued in the first area as soon as the residue information determined in the first area is again below the residue threshold.

The control unit may further be adapted to store the residue information in a data storage device. The term "data storage device" may refer to any storage device that is adapted to store residue information, such as a flash disk or a hard drive or the like. In particular it is possible to store the residue information in the data storage device and read the residue information again from the data storage device, for quality management purposes, for instance.

The control unit may further be adapted to generate a map, in particular a three-dimensional map of the three-dimensional object which is built in the additive manufacturing process, which three-dimensional map spatially resolves the residue information. Thus, it is possible to spatially resolve the residue information in relation to the three-dimensional object that is built during the additive manufacturing process. Hence, it is possible to relate the residue information with different parts or different positions in the three-dimensional object. For example, to relate regions or parts of the three-dimensional object in which the residue information indicated that an amount or a concentration of residues in the stream of gas exceeded a predefined value, in particular that the residue threshold is exceeded or met. As described before, dependent on the residue information an impact on the object quality or the process quality may have been present in the additive manufacturing process.

Thus, the control unit may further be adapted to indicate whether a post-processing, in particular a non-destructive analysis process, is necessary, based on the residue information, in particular based on the three-dimensional map. Hence, as described before, a direct relation between the residue information and the three-dimensional map of the three-dimensional object can be established, wherein the three-dimensional map spatially resolves the residue information that is determined during the additive manufacturing process of the three-dimensional object.

If in one position of the object (in the three-dimensional map) the residue information indicates that the residues the stream of gas was charged with met or exceeded the residue threshold, an impact on the object quality and/or the process quality is possible. In those cases a non-destructive analysis process may be deemed necessary to verify whether a negative impact on object quality occurred during the additive manufacturing process in the corresponding position or part of the object in which the residue information indicated that, for example, the stream of gas was saturated with residues. Accordingly, a non-destructive analysis process, such as a computer tomography, can be performed to verify whether a defect in the three-dimensional object is present.

Besides, the invention relates to a stream generating device for an apparatus for additively manufacturing three-dimensional objects, in particular an inventive apparatus, as described before, wherein a determination unit is provided that is adapted to determine at least one residue information relating to the residues contained in the stream of gas, in particular the amount of residues and/or the concentration of residues in the stream of gas.

Further, the invention relates to a method for operating at least one apparatus for additively manufacturing three-dimensional objects by means of successive layerwise selective irradiation and consolidation of layers of a build material which can be consolidated by means of an energy source, in particular an inventive apparatus, as described before, wherein a stream of gas is generated in a process chamber of the apparatus that is capable of being charged with residues generated in the additive manufacturing process, wherein at least one residue information of the stream of gas is determined relating to the residues contained in the stream of gas, in particular the amount of residues.

Of course, all features, details and advantages described with respect to the inventive apparatus are fully transferable to the inventive stream generating device and the inventive method.

BRIEF DESCRIPTION OF THE DRAWINGS

Exemplary embodiments of the invention are described with reference to the Fig. The Fig. are schematic diagrams, wherein

FIG. 3 shows the cross sectional drawing III-III of FIG. 1; and

FIG. 4 shows the cross sectional drawing IV-IV of FIG. 1.

DETAILED DESCRIPTION

Figure 1:
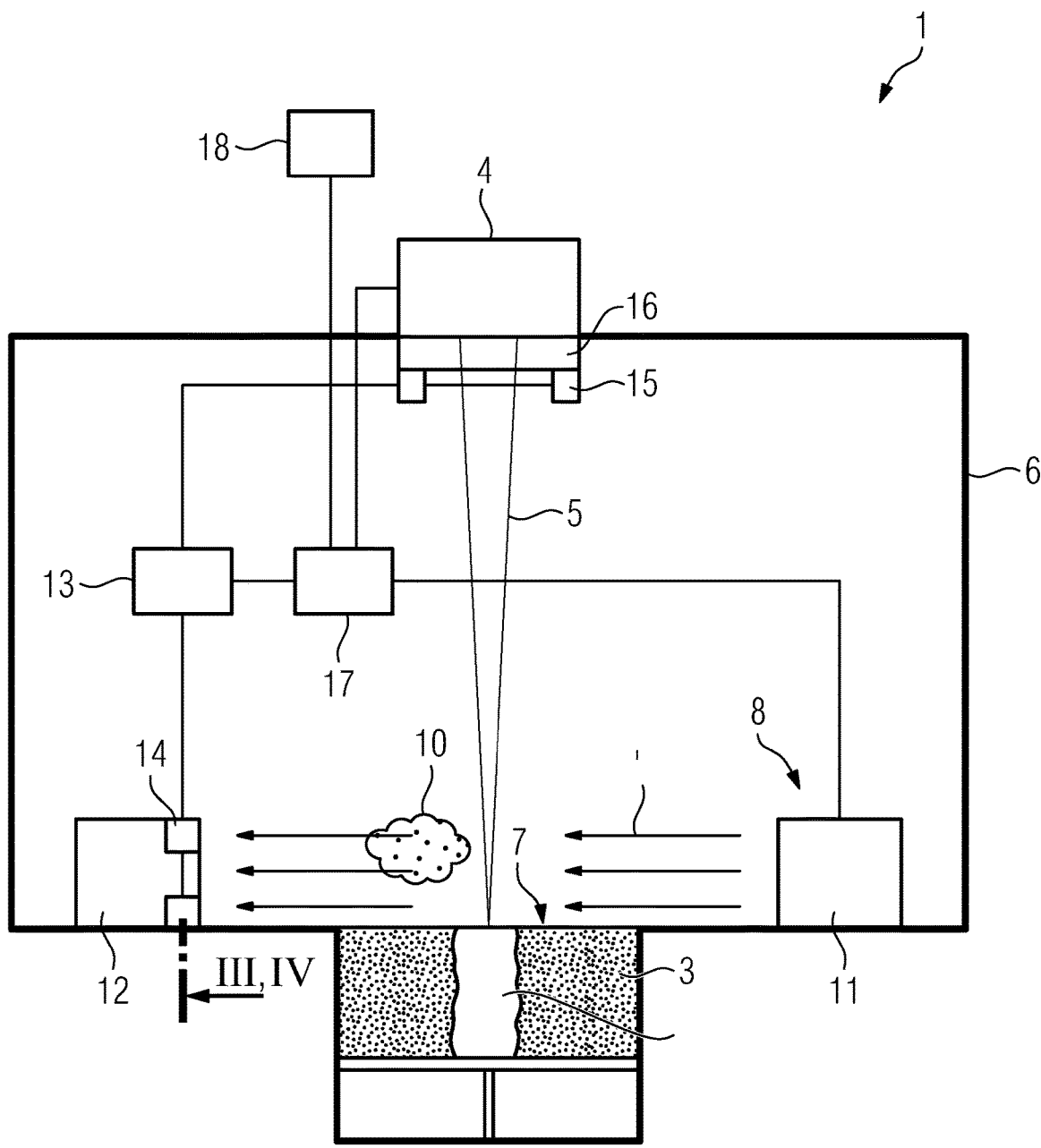
FIG. 1 shows an inventive apparatus side view.

FIG. 1 shows an apparatus 1 for additively manufacturing three-dimensional objects 2 by means of successive layerwise selective irradiation and consolidation of layers of a build material 3 which can be consolidated by means of an energy source 4. The energy source 4 in this exemplary embodiment is built as an irradiation device that is adapted to generate and guide an energy beam 5 in a process chamber 6 of the apparatus 1, in particular over a build plane 7, in which the build material 3 is layerwise arranged to additively build the object 2.

The apparatus 1 further comprises a stream generating device 8 that is adapted to generate a stream of gas 9, in particular process gas, such as an inert gas, e.g. argon. The stream of gas 9 is capable of being charged with residues 10, such as smoke or smolder or swirled up build material particles or the like. The residues 10 can therefore, be transported out of the process chamber 2, as the stream of gas 9 is generated between at least one intake 11 and at least one outlet 12 and can be charged with the residues 10 to transport the residues 10 in streaming direction out of the process chamber 6.

The apparatus 1 comprises a determination unit 13 that is adapted to determine at least one residue information relating to the residues 10 contained in the stream of gas 9, wherein the determination unit 13 is preferably adapted to determine the amount of residues 10 and/or the concentration of residues 10 in the stream of gas 9. In other words, it is possible to determine residue information relating to the residues 10 that are generated in the additive manufacturing process performed on the apparatus 1 via the determination unit 13. To determine the residue information, the determination unit 13 comprises or is connected with two sensors 14, 15, wherein the sensor 14 is arranged at the outlet 12 and the sensor 15 is arranged near a protective glass 16 protecting the energy source 4 from the environment inside the process chamber 6. The protective glass 16 may for example, be built as transparent glass, for example made from PMMA, through which the energy beam 5 can be transmitted and guided over the build plane 7. The specific setup of the sensors 14, 15 is described with respect to FIG. 3, 4 below.

The determination unit 13 is connected with a control unit 17 that is adapted to control at least one stream parameter, for example the flow rate of the stream of gas 9, dependent on the determined residue information that is determined via the determination unit 13. In other words, the stream of gas 9 can be adjusted dependent on the residue information relating to the residues 10 that are generated during the additive manufacturing process. For example dependent on the concentration of residues 10 in the stream of gas 9 or the amount of residues 10 in the stream of gas 9, the control unit 17 is adapted to adjust the stream of gas 9, for example the flow rate of the stream of gas 9 generated via the stream generating device 8.

The control unit 17 is further adapted to adjust at least one process parameter relating to an additive manufacturing process performed on the apparatus 1 dependent on the residue information. The control unit 17 is therefore, specifically adapted to adjust irradiation parameters based on which the energy beam 5 is generated and guided over the build plane 7 via the energy source 4. In particular, irradiation parameters, such as the intensity and/or the power of the energy beam 5 or the scan speed or the writing time or other parameters influencing the energy that is depleted in a volume of build material 3 in the build plane 7, can be adjusted via the control unit 17. Therefore, it is assured that the proper amount of energy is depleted within the build material 3.

Further, the control unit 17 is adapted to temporarily interrupt the irradiation process dependent on the residue information. For example, if a residue threshold (generated and/or received via the control unit 17) is exceeded or met, the control unit 17 is adapted to temporarily interrupt the irradiation process. For example, if the amount of residues 10 in the stream of gas 9 or the concentration of residues 10 in the stream of gas 9 exceed the residue threshold and therefore, a proper irradiation of build material 3 in the build plane 7 cannot be assured, the control unit 17 may temporarily interrupt the irradiation process until the residues 10 present in the process chamber 6 are reduced by transporting the residues 10 via the stream of gas 9 out of the process chamber 6.

Additionally, it is possible to interrupt the additive manufacturing process after at least one work package is finished, for example at least one layer or at least one part of the layer, such as a scan vector and/or at least one island and/or at least one stripe. Thus, a respective structure can be finished before the irradiation process is stopped.

As the two sensors 14, 15 are assigned to the determination unit 13, it is possible to have two sections inside the process chamber 6 in which the residue information is determined. For example, if the sensor 14 determines the residue information, the additive manufacturing process and the stream generating device 8 can be controlled via the control unit 17 to reduce the residues 10 generated in the additive manufacturing process and present in the process chamber 6. The irradiation process has only to be interrupted, if the residues 10 exceed the residue threshold, as described before, for example if it is indicated that the stream of gas 9 is saturated and cannot be charged with more residues 10 so that the residues 10 cannot be properly removed from the process chamber 6.

However, if the residue information generated via the sensor 15, which is arranged below the protective glass 16, indicates that residues 10 are present within the area of the protective glass 16 or below the protective glass 16, an interruption of the additive manufacturing process may instantly be deemed necessary, as the residues 10 are spread throughout the process chamber 6 and influence the energy beam 5 as it is transmitted through the process chamber 6 towards the build plane 7. Again, in both cases the additive manufacturing process can be continued after the residue information has again fallen below the residue threshold.

The control unit 17 is further connected with a data storage device 18 in which the residue information can be stored from where it can be read again, for example for quality management purposes. In particular, the control unit 17 is adapted to generate a map and store the map in the data storage device 18, wherein the map may be a three-dimensional map of the three-dimensional object 2, which map spatially resolves the residue information in relation to the object 2. Thus, the control unit 17 is adapted to indicate whether a post-processing, in particular a non-destructive analysis process, is necessary, based on the residue information, in particular based on the three-dimensional map stored in the data storage 18. For example, if the three-dimensional map indicates at least one part of the object 2 in which the residue information determined via the determination unit 13 indicates that residues 10 were present in the process chamber 6 to a defined extent, in particular above the residue threshold, a possible impact on the object quality can be concluded, wherein a post-processing is deemed necessary to verify whether the object 2 shows imperfections.

Figure 2:
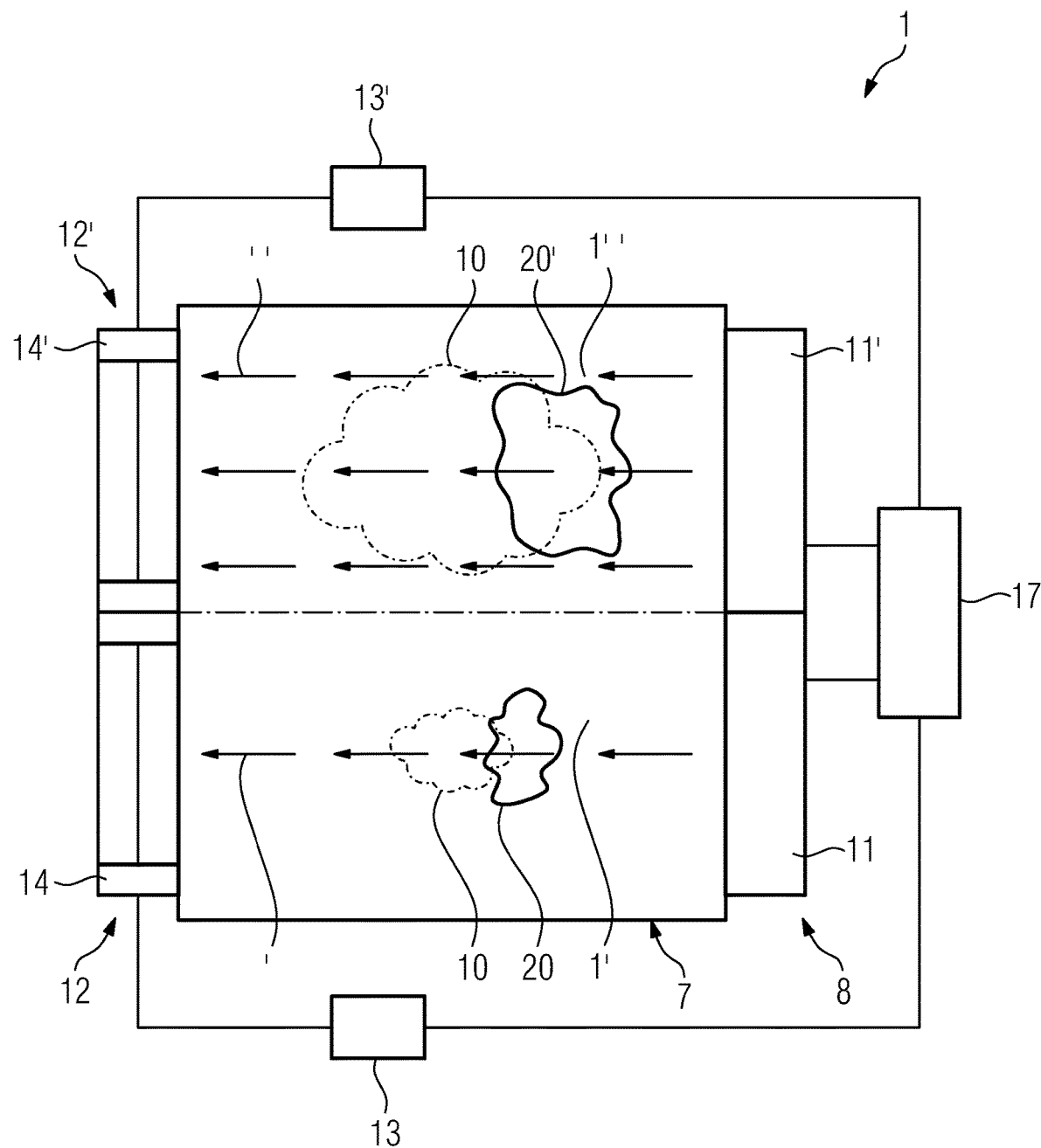
FIG. 2 shows the inventive apparatus of FIG. 1 in top view.

FIG. 2 shows a top view on an inventive apparatus 1, wherein the same numerals are used for the same parts. The stream generating device 8 according to the situation that is depicted in FIG. 2 comprises two intakes 11, 11' and two outlets 12, 12', wherein two streams of gas 9, 9' are generated streaming over two areas 19, 19' of the build plane 7. The apparatus 1 according to FIG. 2 further comprises two determination units 13, 13' that are adapted to determine residue information relating to residues 10 generated in the respective areas 19, 19'. Therefore, sensors 14, 14' are arranged at the outlets 12, 12'.

The control unit 17 is, inter alia, adapted to individually control the stream parameters of the streams of gas 9, 9' which flow over the areas 19, 19', based on the residue information that are determined via the individual determination units 13, 13'. For example, a first stream of gas 9 is guided over the build plane 7, in particular over the first area 19, wherein the determination unit 13 determines the residue information (using the sensor 14) related to residues 10 present in the stream of gas 9 streaming over the first area 19. Analogously, the determination unit 13' is adapted to determine residue information (using the sensor 14') relating to residues 10 contained in the stream of gas 9' streaming over the second area 19'.

Dependent on the individual residue information it is possible that the control unit 17 adjusts the stream parameters in that the stream of gas 9 can stream with other stream parameters than the stream of gas 9', for instance. In the exemplary embodiment that is depicted in FIG. 2, an irradiation pattern 20 in the first area 19 is much smaller than an irradiation pattern 20' in the area 19'. Thus, the residues 10 generated in the area 19 are fewer than those generated in the area 19', as the energy beam 5 irradiates a smaller region of build material 3 in the area 19 than in the area 19'. Therefore, the control unit 17 adjusts the flow rate of the streams of gas 9, 9' in that the stream of gas 9' streams faster compared with the stream of gas 9 in the area 19.

Of course, the control unit 17 is also adapted to individually control the process parameters for the different areas 19, 19'. For example, if the residue information indicate that residues 10 present in the area 19' exceed the residue threshold, the irradiation process can be interrupted in the area 19', whereas the irradiation process can be continued in the area 19 as long as the residue information indicates that the residues 10 present in the area 19 are below the residue threshold. The irradiation process in the area 19' can be continued as soon as the residue information indicate is again below the residue threshold.

FIG. 3 shows a sensor 14, 15 as described before, for example arranged at an outlet 12, 12'. The sensor 14, 15 is adapted to generate and emit a sensor signal 21 which is transmitted through the stream of gas 9, 9' and is reflected at a reflector 22 and therefore, sent back towards the sensor 14, 15. Dependent on the intensity of the sensor signal 21 that is received by the sensor 14, 15 it is possible to determine the amount and/or the concentration of residues 10 contained in the stream of gas 9,9'. In this configuration it is possible to compare the initial signal 21 that was emitted from the sensor 14, 15 with the signal 21 that is received by the sensor 14, 15. Thus, a part of the signal that is absorbed or scattered at the residues 10 contained in the stream of gas 9, 9' can be determined. As the part of the signal 21 that is lost due to the residues 10 is related with the amount and/or the concentration of residues 10 in the stream of gas 9, 9', the residue information may indicate the amount and/or the concentration of residues 10.

FIG. 4 shows an alternative approach for the sensor 14, 15, wherein the sensor signal 21 is focused on the stream of gas 9, 9' in which residues 10 are obtained. Simultaneously the intensity of scattered light 22 which can be deemed as sensor signal, is measured via the sensor 14, 15 to determine the residue information, in particular to determine the amount of residues 10 in the stream of gas 9, 9' and/or the concentration of residues 10 in the stream of gas 9, 9'. As the intensity of the scattered light 22 that is reflected at the residues 10 is related with the amount and/or the concentration of residues 10 in the stream of gas 9, 9', the residue information may indicate the amount and/or the concentration of residues 10.

Self-evidently, the inventive method may be performed on the inventive apparatus 1, preferably using an inventive stream generating device 8.

The invention claimed is:

1. A method for additively manufacturing three-dimensional objects by successive layerwise selective irradiation and consolidation of layers of a build material by an energy source, the method comprising:
   generating a stream of gas inside a process chamber, wherein the stream of gas can comprise residues generated during an additive manufacturing process;
   determining at least one residue information relating to the residues contained in the stream of gas;
   controlling at least one stream parameter and/or process parameter dependent on the at least one residue information; and,
   generating and/or receiving one or more residue thresholds, wherein the additive manufacturing process is interrupted after at least one work package is finished if the at least one residue information exceeds at least one of the one or more residue thresholds.

2. The method of claim 1, wherein the at least one residue information comprises an amount of residues and/or a concentration of residues.

3. The method of claim 1, wherein the at least one stream parameter comprises a flow rate of the stream of gas.

4. The method of claim 1, wherein the at least one process parameter comprises an irradiation parameter.

5. An apparatus for additively manufacturing three-dimensional objects by successive layerwise selective irradiation and consolidation of layers of a build material by an energy source, the apparatus comprising:
   a stream generating device adapted to generate a stream of gas inside a process chamber, wherein the stream of gas can comprise residues generated during an additive manufacturing process;
   a determination unit adapted to determine at least one residue information relating to the residues contained in the stream of gas; and,
   a control unit adapted to control at least one stream parameter and/or process parameter dependent on the at least one residue information, wherein the control unit is adapted to generate and/or receive one or more residue thresholds, and wherein the control unit interrupts the additive manufacturing process after at least one work package is finished if the at least one residue information exceeds at least one of the one or more residue thresholds.

6. The apparatus of claim 5, wherein the at least one residue information comprises an amount of residues and/or a concentration of residues.

7. The apparatus of claim 5, wherein the control unit interrupts the additive manufacturing process after completion of at least one scan vector and/or at least one island and/or at least one stripe and/or at least one layer.

8. The apparatus of claim 5, wherein the at least one stream parameter comprises a flow rate of the stream of gas.

9. The apparatus of claim 5, wherein the at least one process parameter comprises an irradiation parameter.

10. The apparatus of claim 5, wherein the determination unit comprises at least one sensor adapted to measure a transmission of light through a volume of gas to determine the at least one residue information.

11. The apparatus of claim 5, wherein the determination unit comprises at least one sensor arranged proximate at least one gas outlet wherein the stream of gas streams through the gas outlet out of the process chamber.

12. The apparatus of claim 5, wherein the apparatus comprises at least two determination units assigned to at least two different gas outlets wherein the stream of gas streams through the at least two gas outlets out of the process chamber.

13. The apparatus of claim 5, wherein the stream generating device generates at least two different streams of gas, wherein the at least two different streams of gas stream over different areas of a build plane in the process chamber.

14. The apparatus of claim 13, wherein the control unit is adapted to control the at least two different streams of gas dependent on different residue information determined via at least two different determination units.

15. The apparatus of claim 5, wherein the control unit is adapted to store the at least one residue information in a data storage device.

16. The apparatus of claim 5, wherein the control unit is further adapted to generate a map of the three-dimensional object.

17. The apparatus of claim 5, wherein the control unit is further adapted to determine whether a post-processing is necessary based on the at least one residue information.

* * * * *